United States Patent
Cruickshank

(12) 
(10) Patent No.: US 6,389,005 B1
(45) Date of Patent: May 14, 2002

(54) AUTOMATIC BACKUP TRUNKING FOR VOICE OVER THE INTERNET

(75) Inventor: Brian Cruickshank, Oakville (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 08/980,760

(22) Filed: Dec. 1, 1997

(51) Int. Cl.⁷ .............................................. H04L 12/66
(52) U.S. Cl. ...................................................... 370/352
(58) Field of Search ................................. 370/351, 352, 370/353, 355, 356, 225, 227; 340/826, 827; 379/88.17, 221

(56) References Cited

U.S. PATENT DOCUMENTS

| | | | |
|---|---|---|---|
| 4,996,685 A | | 2/1991 | Farese et al. ............... 370/58.1 |
| 5,602,846 A | * | 2/1997 | Holmquist ................... 370/384 |
| 5,712,907 A | * | 1/1998 | Wegner et al. ............... 379/112 |
| 5,848,143 A | * | 12/1998 | Andrews et al. ............. 379/219 |
| 5,867,494 A | * | 2/1999 | Krishnaswamy et al. ... 370/352 |
| 6,064,653 A | * | 5/2000 | Farris ........................ 370/237 |

FOREIGN PATENT DOCUMENTS

| | | |
|---|---|---|
| CA | 2205731 | 11/1998 |
| WO | WO 97/27692 | 7/1997 |

OTHER PUBLICATIONS

Bob Emmerson, International Bits, Internet Telephony, May 1997, XP–000770894, p. 1.*

Grün, Michael, and Hahn, Norbert, Wege aus dem DateN-stau IP–Telefonie und die Verkehrsbedingungen im Internet, XP–000740475, 1998, pp 46–49.

Houghton, T.F. et al., A Packet Telephony Gateway for Public Network Operators, XP–000704453, Sep. 21, 1997, pp 35–44.

European Search Report for corresponding EP 98 30 8869, European Patent Office, Jul. 12, 2001, pp 1–2.

* cited by examiner

Primary Examiner—Chau Nguyen
Assistant Examiner—Alexander O. Boakye

(57) ABSTRACT

To reduce telephone toll costs to a user, a PBX preferentially establishes a call to a destination number (DN) over a WAN or the internet. The PBX determines the available connection types available by querying look-up tables for the particular DN. If no alternatives to the PSTN are available, the call is routed over the PSTN. Where a WAN or internet connection is available, the call is then routed over this alternative service. If the Quality of Service (QoS) over the computer network connection falls below a specified threshold, a second parallel connection is made over the PSTN and the call is then transferred to the PSTN. The user is notified of this change in service. During the PSTN connection, the PBX polls the alternative service and, upon the QoS rising above a specified threshold, the call is then routed back to the alternative service and the PSTN connection is torn down. The user is again notified of this change in service.

15 Claims, 4 Drawing Sheets

AUTOMATIC BACKUP TRUNKING FOR VOICE OVER THE INTERNET

BACKGROUND OF THE INVENTION

This invention relates to a method and apparatus for routing a telephone call.

Voice communication over the internet is known. However, such communication typically requires that both parties be logged on to an internet provider, be running compatible voice communication software, and have the necessary hardware (e.g., microphone and speakers). Further, voice communication over the internet may degrade due to congestion.

SUMMARY OF THE INVENTION

According to the present invention, there is provided a method for routing a telephone call, comprising the steps of: receiving a destination number (DN) for said call; based on said DN, determining whether a connection is possible through a computer network; where a computer network connection is possible, routing said call through said computer network; where a computer network connection is not possible, routing said call through a switched telephone network.

According to another aspect of the present invention, there is provided a call router for routing a telephone call, comprising: a receiver for receiving an outgoing call; a detector responsive to said receiver for detecting a destination for said call; a determiner responsive to said destination detector for determining whether or not a connection is possible through a computer network; a route initiator responsive to said determiner for initiating a route for said call through one of said computer network and a switched telephone network.

BRIEF DESCRIPTION OF THE DRAWINGS

In the figures which show an example embodiment of the invention.

DETAILED DESCRIPTION OF THE PREFERRED EMBODIMENTS

Figure 1:
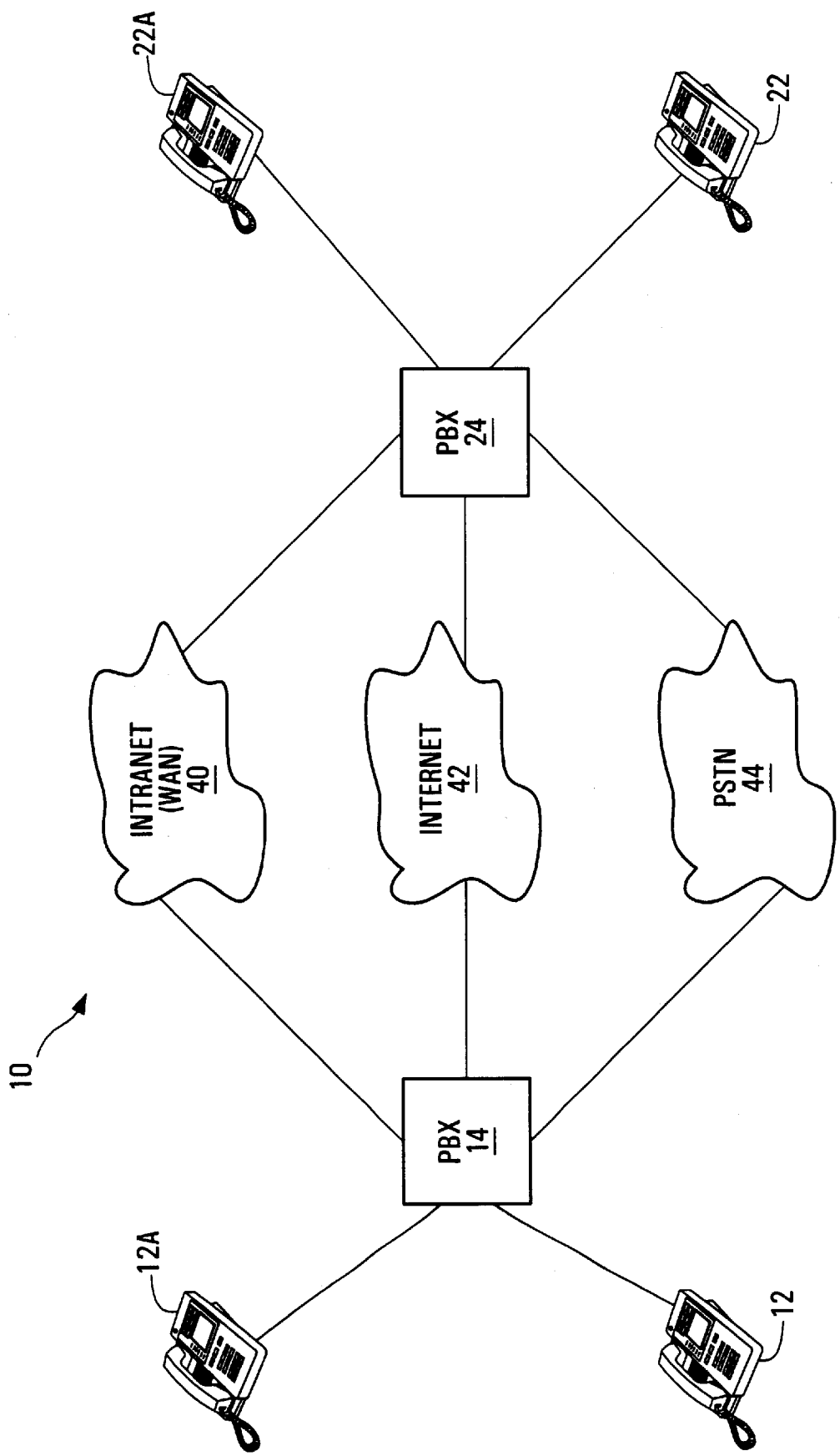
FIG. 1 is a schematic view of a communication system embodying this invention.

Turning to FIG. 1, a communication system illustrated generally at 10 comprises a plurality of telephone appliances 12 connected to a first private branch exchange (PBX) 14 and a plurality of telephone appliances 22 connected to a second PBX 24. PBX 14 and PBX 24 are each connected to a wide area network (WAN), or intranet, 30, an internet 32, and a public switched telephone network (PSTN) 34.

Figure 2:
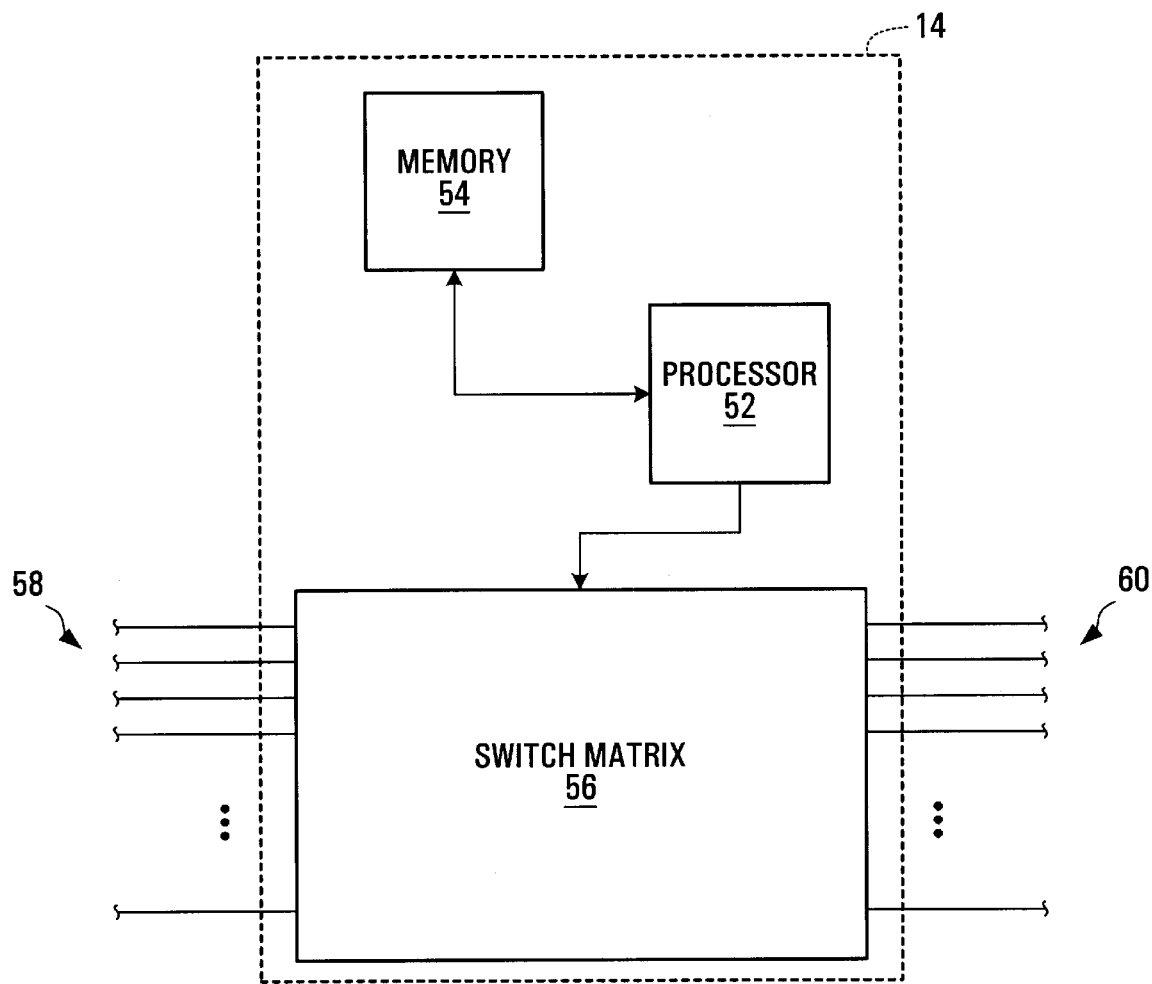
FIG. 2 is a schematic detail of a portion of FIG. 1.

Referencing FIG. 2, PBX 14 comprises a processor 52 connected for two-way communication with a memory 54 and having a control input to a switch matrix 56. The switch matrix has inputs 58 from telephone appliances connected to the PBX and outputs 60 to these telephone appliances and to intranet, internet, and PSTN lines. PBX 24 is identically configured.

Figure 3A:
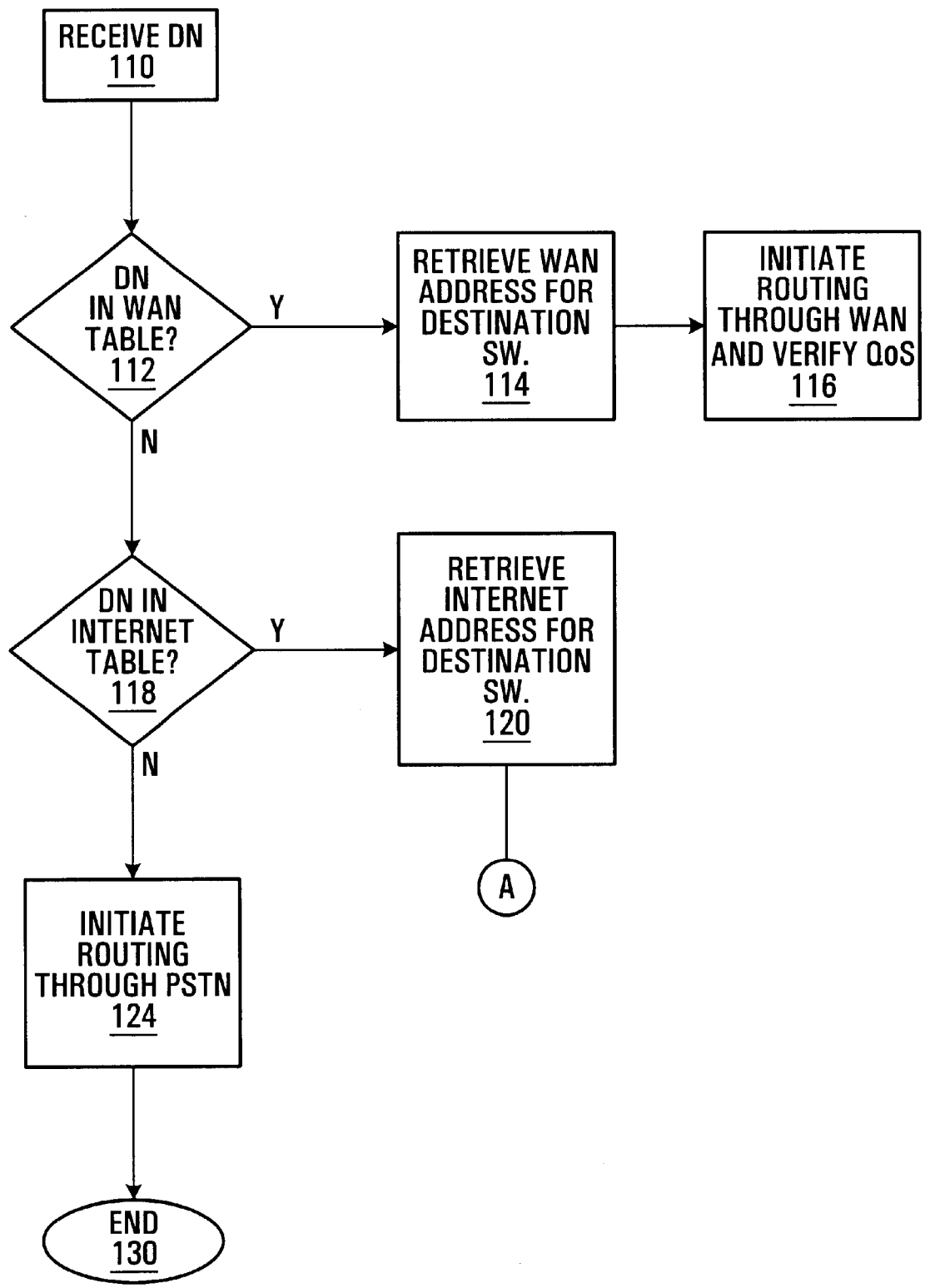
FIGS. 3a and 3b comprise a flow diagram of the program control for a portion of the system of FIG. 1.
Figure 3B:
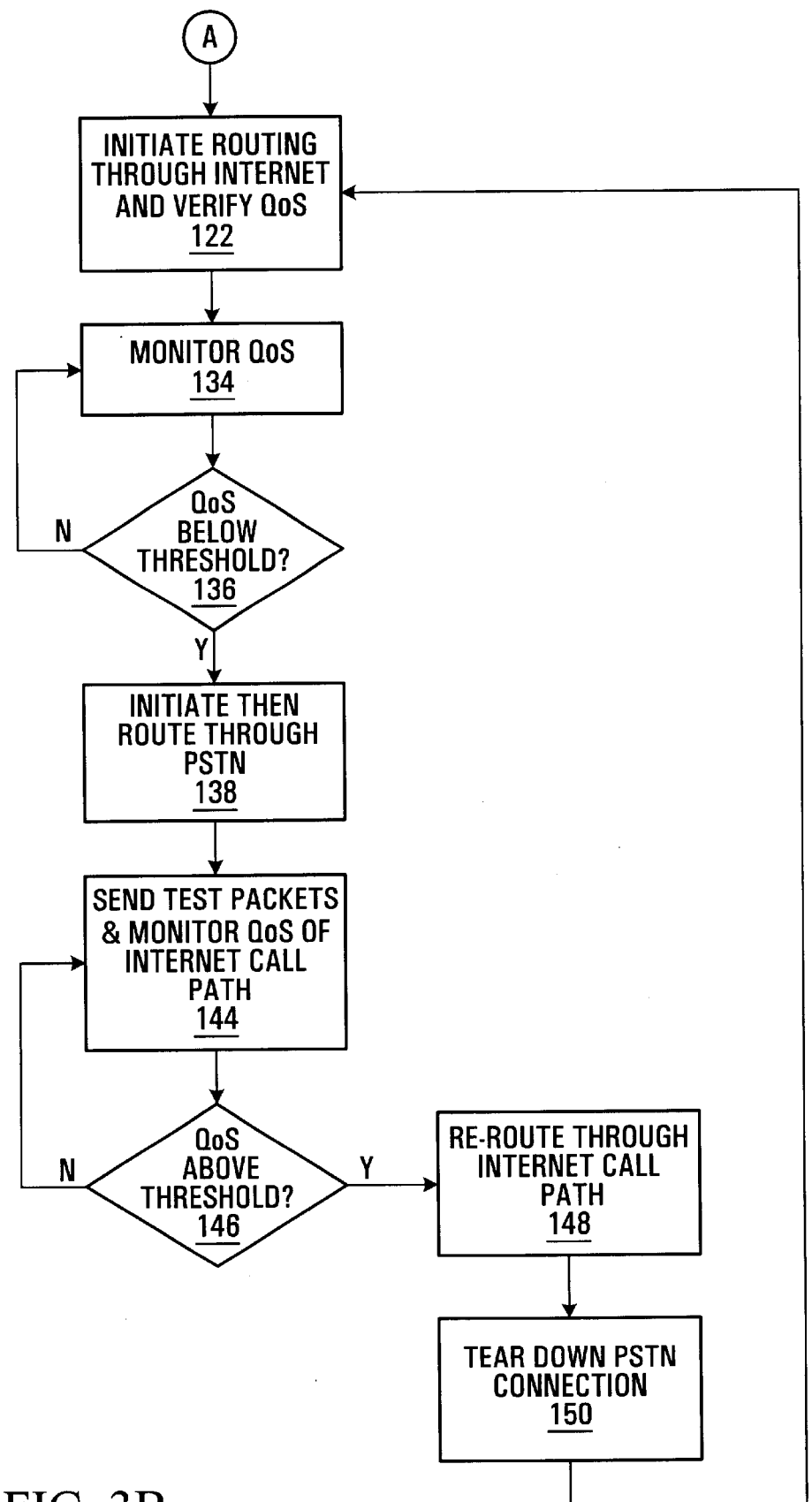

The operation of the communication system of FIGS. 1 and 2 is described in conjunction with FIGS. 3a and 3b, which illustrates the program control for processor 52 of PBX 14.

If a user of telephone appliance 12a goes off-hook and dials a destination number (DN) for telephone appliance 22a, the PBX 14 receives the DN (block 110). The processor of the PBX retrieves a WAN look-up table from memory 54 and determines whether the DN appears in the table (block 112). If yes, this means that the DN is for a telephone appliance associated with a PBX on the WAN and the processor retrieves the WAN address associated with the DN from the look-up table (block 114). The WAN address is an indication of a destination PBX on the WAN to which the called telephone appliance is associated. In the illustrative example, the address for PBX 24 would appear in the WAN table. With this information, PBX 14 routes the call through its switch matrix 56 to a WAN line and initiates routing through the WAN in order to complete the call (block 116), verifying in the process that the Quality of Service (QoS) is high enough to support a real-time telephone conversation by measuring the packet delay.

If the user of telephone 12a dialed the DN for a telephone appliance not on the WAN or the call required a QoS above that available on the WAN, then PBX 14 next accesses an internet look-up table and searches for the DN (block 118). If an entry is found, the internet address is retrieved (block 120) and the PBX 14 initiates routing through the internet to the destination PBX (block 122), verifying in the process that the QoS is high enough to support a real-time telephone conversation.

Assuming PBX 14 did not have an internet look-up table entry for the DN, or the QoS was not high enough to support a telephone conversation, the PBX initiates routing of the call through the PSTN (blocks 124, 130).

Whenever a call is established over the internet, PBX 14 monitors the quality of service (QoS) of the internet call path (block 134). This involves measuring such parameters as packet delay, the number of data packets dropped and throughput. Preferably QoS is measured using the known Real-Time Transport Control Protocol (RTCP). If the QoS falls below a first threshold (block 136), then PBX 14 initiates the setting up of a parallel call path to the destination PBX over the PSTN. Once this parallel path is established, PBX 14 sends a sequence of in-band tones over the PSTN to the destination PBX which uniquely identifies the internet connection carrying the call's voice path connection (e.g. the calling and called telephone numbers). The destination PBX sends a confirmation tone over the PSTN to PBX 14 indicating when it has found the connection. (This interaction is done over the PSTN instead of over the internet because the internet is assumed to be suffering delays due to congestion at this time.) The confirmation tone is used as a signal for both PBXs to simultaneously switch the voice path from the internet to the PSTN. Since the internet voice path is suffering quality problems such as excessive delay, it will normally be acceptable to switch the voice path without waiting for a silence interval. A notification tone can be sent to the calling and called parties during a silence interval to notify them that the call has been re-routed. Typically a PSTN connection generates higher user charges than an internet connection and so the alerting informs the parties of their use of a higher price connection.

After the change-over, the internet call path is maintained and PBX 14 sends test packets over the internet call path to allow it to continuously monitor the QoS of the connection (block 144). If the QoS improves so as to exceed a second threshold—which may be set higher than the first threshold (block 146), PBX 14 monitors for silence on the PSTN connection, then initiates routing of the call through the internet (block 148). The PBX may also send an in-band signal to alert the parties of a switch over back to the internet connection. The PBX then initiates tearing down of the PSTN connection (block 150).

For the duration of the call, PBX 14 monitors the QoS of the internet connection and re-establishes a PSTN connection whenever necessary.

In the foregoing, it is assumed that the WAN 40 is able to guarantee a QoS for each connection. If this is not the case, then the PBX 14 monitors and responds to the QoS on the WAN in the same fashion as it monitors and responds to the QoS on the internet.

By utilising a computer network (intranet or internet) call path in preference to a PSTN call path, the communication system 10 minimizes toll costs of a call. Additionally, the communication system 10 provides a "safety factor" for any call over a computer network in that should the QoS of the call degrade for any reason, the call will be rerouted through the PSTN.

While FIG. 1 illustrates two networked PBXs, it will be readily apparent that any number of PBXs may form part of a "corporate" network. When any new PBX is to join the corporate network and this new PBX is connected to the internet, a system operator enters the internet protocol (IP) address of a "reference" PBX in the corporate network. The reference PBX can be any active PBX of the corporate network which has an internet connection. This prompts the new PBX to send a message to this IP address identifying itself as a new PBX on the corporate network along with the range of DNs to which it responds and an authentication code. The reference PBX returns a message which contains a mapping between corporate network DN ranges and IP addresses for all of the PBXs in the corporate network. The new PBX stores this information in a look-up table and then sends a message to each of the PBXs in the corporate network identifying itself as a new PBX on the corporate network and specifying the range of DNs to which it responds. Upon receiving this message, the other PBXs update their look-up table to include this new PBX. This same procedure may be used to incorporate a new PBX in a WAN of the corporate network.

Efficiency of the corporate network may be further enhanced by a modification wherein each PBX periodically sends test messages to each of the other PBXs in the corporate network to determine the quality of service of the WAN/internet connections between itself and the other PBXs. If it determines that the quality of service with another PBX is not high enough to support an acceptable voice conversation, it will set a "poor Voice Quality" flag in a look-up table indicating that calls to this PBX should be routed over the PSTN. This flag will be cleared when subsequent tests indicate that the quality of service achievable over the WAN/internet connection to this PBX has returned to an acceptable level.

With this modification, when a user places a call to a remote PBX, the load PBX will look up the IP address of the remote PBX and check the Poor Voice Quality flag associated with that PBX. If the remote PBX has an IP address in the look-up table and its Poor Voice Quality flag is not set, the local PBX will set up the call over the WAN or internet. Otherwise it will set up the call over the PSTN.

While the illustrative embodiments reference the PSTN, it will be appreciated that this network could equally be a network of leased lines or other switched telephone network. If the switched telephone network does not support an end-to-end digital connection, it may be necessary to convert an incoming call from analog to digital in any known fashion before the call is routed over an internet connection.

Each PBX in the illustrative embodiment could be replaced by any intelligent switch. Further, instead of programming a PBX or other intelligent switch to perform as described, a special purpose router could be associated with the switch. The switch would then be programmed to query the router for instructions whenever a call arrived and the router would instruct the switch to operate in the manner described for the PBX hereinbefore. As a further alternative, if the switch was a signal switching point (SSP) in an advanced intelligent network (AIN), then, as is standard in an AIN, the SSP queries a supervisory control point (SCP) when a call arrives. The SCP could contain the program control for the SSP such that the SSP operated in the manner hereinbefore described for the PBX.

Other modifications will be apparent to those skilled in the art and, therefore, the invention is defined in the claims.

What is claimed is:

1. A method for routing a telephone call, comprising:
   receiving a destination number (DN) for said call;
   based on said DN, determining whether a connection is possible through an intranet;
   where an intranet connection is possible, routing said call through said intranet;
   where an intranet connection is not possible, determining if an internet connection is possible;
   and where an intranet connection is not possible and an internet connection is possible, routing said call through said internet preferentially to routing said call through a switched telephone network; and
   where neither an internet nor an intranet connection is possible, routing said call through said switched telephone network.

2. A method for routing a telephone call, comprising:
   receiving a destination number (DN) for said call;
   based on said DN, determining whether a connection is possible through a computer network;
   where a computer network connection is not possible, routing said call through a switched telephone network;
   where said call is routed on a path through said switched telephone network and a computer network connection becomes possible, (i) monitoring for a period of silence on said switched telephone network path and (ii) during a period of silence, switching said call from said switched telephone network path to said computer network connection and tearing down said switched telephone network path.

3. The method of claim 2 wherein said computer network comprises an internet and wherein said switched telephone network comprises a public switched telephone network (PSTN).

4. The method of claim 2 wherein said computer network comprises an intranet.

5. The method of claim 2 wherein said telephone call is a first call and further comprising receiving a DN for a second call; determining, based on said DN for said second call, whether a connection is possible through said computer network; and, where a computer network connection is possible, routing said second call through said computer network.

6. A switch for routing a telephone call comprising;
   means for receiving a destination number (DN) for said call;
   means for, based on said DN, determining whether a connection is possible through a computer network;
   means for, where a computer network connection is not possible, routing said call through a switched telephone network and for, where said call is routed on a path through said switched telephone network and a computer network connection becomes possible, (i) monitoring for a period of silence on said switched telephone network path and (ii) during a period of silence, switching said call from said switched telephone network path to said computer network connection and tearing down said switched telephone network path.

7. The switch of claim 6 wherein said computer network comprises an internet and wherein said switched telephone network comprises a public switched telephone network (PSTN).

8. The switch of claim 6 wherein said computer network comprises an intranet.

9. A switch for routing a telephone call from a calling station to a called station, comprising:
   means for receiving a destination number (DN) for said call;
   means for, based on said DN, determining whether a connection is possible through an intranet;
   means for, where an intranet connection is possible, routing said call through said intranet;
   means for, where an intranet connection is not possible, determining if an internet connection is possible;
   means for, where an intranet connection is not possible and an internet connection is possible, routing said call through said internet preferentially to routing said call through a switched telephone network; and
   means for, where neither an internet nor an intranet connection is possible, routing said call through said switched telephone network.

10. A method for routing telephone calls, comprising:
    receiving a destination number (DN) for each of a plurality of calls;
    based on a DN for each call, determining whether a connection is possible through an intranet;
    where, for a first call, an intranet connection is possible routing said call through said intranet;
    where, for a second call, an intranet connection is not possible, determining if an internet connection is possible;
    where, for said second call, an internet connection is possible, routing said second call through said internet preferentially to routing said second call through a switched telephone network; and
    where, for a third call, an intranet connection is not possible, determining if an internet connection is possible;
    where, for said third call, an internet connection is not possible, routing said third call through said switched telephone network.

11. The method of claim 10 further comprising:
    where, for said second call, said internet connection becomes no longer viable, (i) sending an alert notification to a calling station and a called station associated with said second call and (ii) switching said second call from said internet to a switched telephone network.

12. The method of claim 11 wherein said switched telephone network comprises a public switched telephone network (PSTN).

13. A switch for routing a telephone call, comprising:
    means for receiving a destination number (DN) for each of a plurality of calls;
    means for, based on a DN for each call, determining whether a connection is possible through an intranet; and for, for a given call for which an intranet connection is not possible, determining if an internet connection is possible;
    means for, (i) where, for a first call, an intranet connection is possible, routing said call through said intranet; (ii) where, for a second call, an intranet connection is not possible and an internet connection is possible, routing said second call through said internet; and (iii) where, for a third call, neither an intranet connection nor an internet connection is possible, routing said third call through a switched telephone network.

14. The switch of claim 13 further comprising:
    means for, where for said second call, said internet connection becomes no longer viable, (i) sending an alert notification to a calling station and a called station associated with said second call and (ii) switching said second call from said internet to a switched telephone network.

15. The switch of claim 14 wherein said switched telephone network comprises a public switched telephone network (PSTN).

* * * * *

UNITED STATES PATENT AND TRADEMARK OFFICE
CERTIFICATE OF CORRECTION

PATENT NO. : 6,389,005 B1
DATED : May 14, 2002
INVENTOR(S) : Brian Cruickshank

It is certified that error appears in the above-identified patent and that said Letters Patent is hereby corrected as shown below:

Column 4,
Line 61, replace "call comprising;" with -- call comprising: --

Column 5,
Line 39, replace "is possible;" with -- is possible, --

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,389,005 B1  
DATED : May 14, 2002  
INVENTOR(S) : Brian Cruickshank It is certified that error appears in the above-identified patent and that said Letters Patent is hereby corrected as shown below:

<u>Title page,</u>  
Item [56], References Cited, U.S. PATENT DOCUMENTS, insert:  
-- 6,021,176 A * 1/2000 McKendry et al. 379/35  
6,011,792 A * 2/1997 Miloslavsky 370/352 --

OTHER PUBLICATIONS, delete "Bob Emmerson, International Bits, Internet Telephony, May 1997, XP-000770894, p. 1. *"

Signed and Sealed this

Seventeenth Day of February, 2004

JON W. DUDAS  
*Acting Director of the United States Patent and Trademark Office*